March 12, 1968     E. L. WALTERS ET AL     3,372,847
GLASS BREAKING APPARATUS
Filed June 3, 1965     2 Sheets-Sheet 1
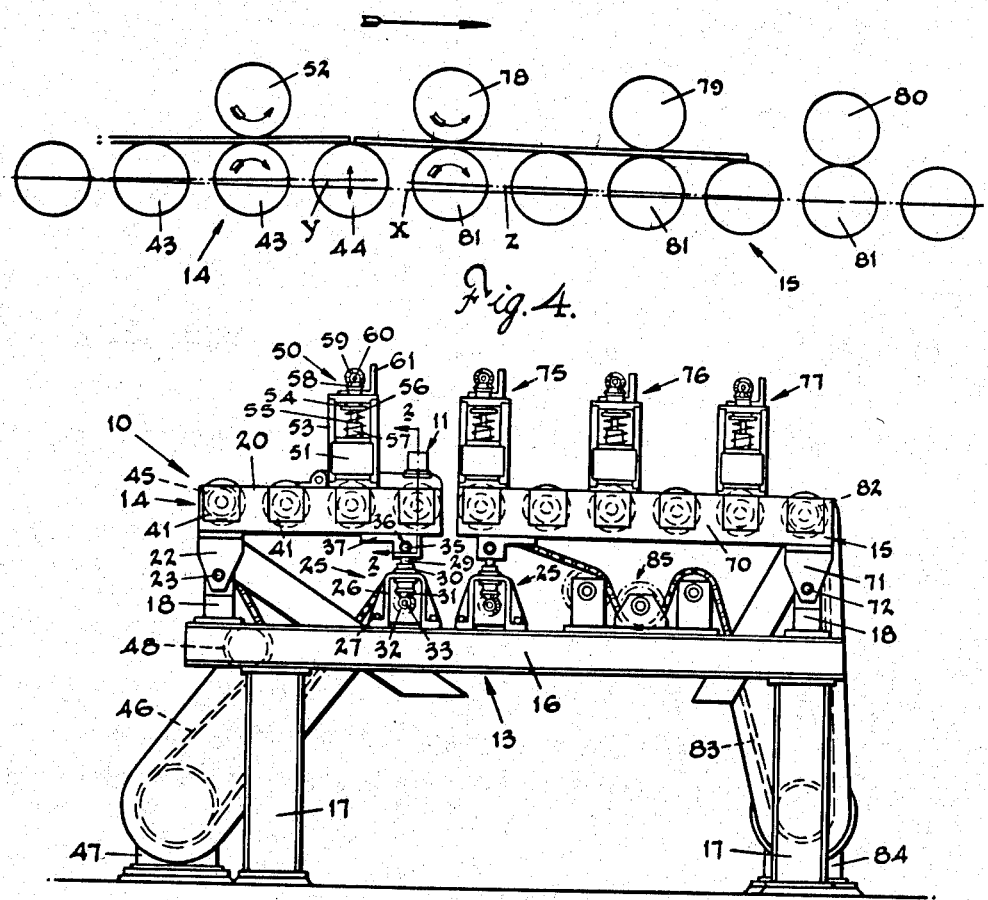
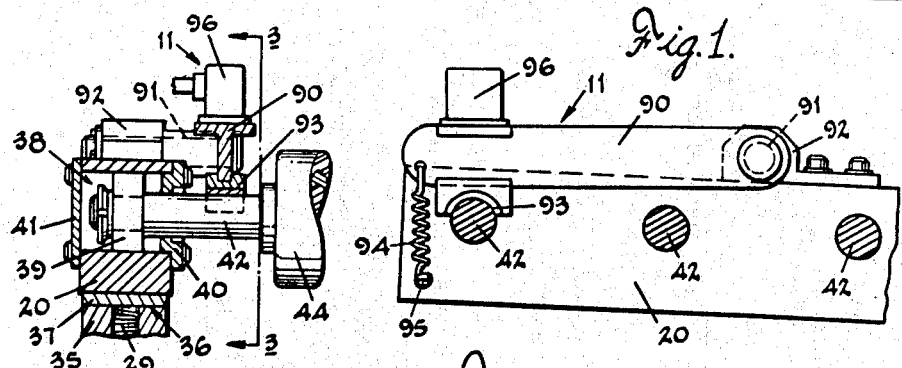
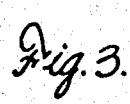

3,372,847
GLASS BREAKING APPARATUS

Emmett L. Walters and William E. McCown, Toledo, Ohio, assignors to Libbey-Owens-Ford Glass Company, Toledo, Ohio, a corporation of Ohio
Filed June 3, 1965, Ser. No. 460,969
12 Claims. (Cl. 225—2)

This invention relates to glass cutting and breaking and more particularly to an improved apparatus for running the cut along a score line which has been made in a glass sheet.

The primary object of this invention is to provide improved method and apparatus for breaking a scored sheet in a manner to leave high-quality cut edges on the glass regardless of variable thickness, width and annealing characteristics of the sheets being cut.

Another object is to provide improved apparatus which will produce vibrations at one edge of a moving glass sheet to run a cut along a score line in the moving glass sheet.

Other objects and advantages of the invention will become more apparent during the course of the following description when read in connection with the accompanying drawings.

In the drawings, wherein like numerals are employed to designate like parts throughout the same:

FIG. 1 is a side elevation of a glass breaking unit including vibrating means constructed in accordance with the invention;

FIG. 2 is a fragmentary transverse sectional view taken along lines 2—2 of FIG. 1;

FIG. 3 is a fragmentary sectional view taken along lines 3—3 of FIG. 2;

FIG. 4 is a diagrammatic view of the arrangement of the rolls of the glass breaking unit;

Figure 5:
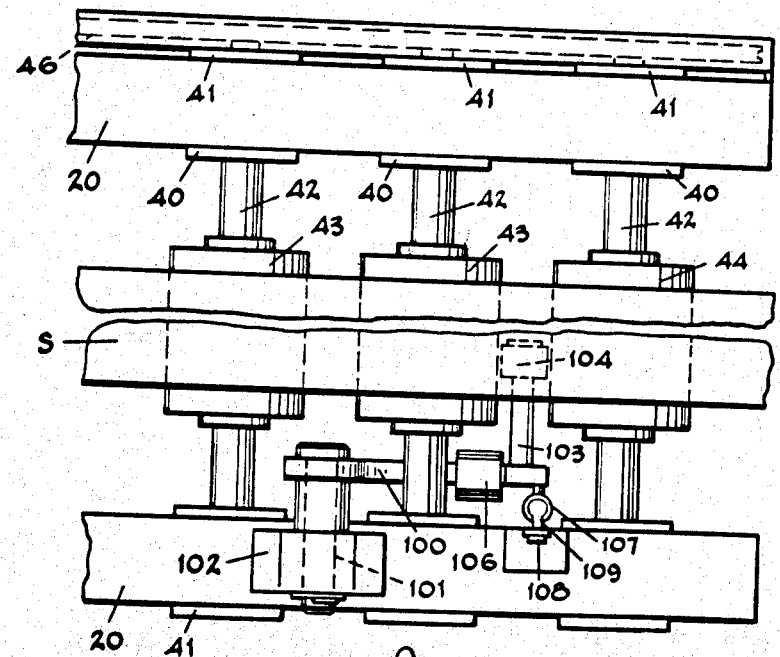
FIG. 5 is a fragmentary plan view showing a modified form of vibrating means.

In accordance with the invention, a glass sheet breaking unit is provided with means for producing vibrations adjacent one edge of a moving glass sheet which will assist in beginning a break adjacent that edge along a score line and running the break the length of the score line.

Although not limited to such use, the apparatus has proven particularly advantageous when used in combination with glass breaking units of the general type disclosed in the automatic glass cutting machine of the Walters et al. patent No. 2,948,991, issued Aug. 16, 1960. Accordingly, this invention will be specifically described in that connection here.

With particular reference to FIG. 1, there is shown a glass breaking unit 10 constructed according to the above-mentioned patent and provided with a vibrating means 11 constructed in accordance with this invention.

The glass breaking unit includes a framework 13, with first and second conveyor means 14 and 15, mounted on the framework. The framework comprises, spaced parallel beams 16 (only one being shown), mounted on spaced pedestals 17, with opposite ends of the beams 16 being provided with spaced upstanding posts 18.

The first or feeding conveyor means 14 includes spaced bases 20 pivotally mounted at one end by yoke members 22 which are received on spaced posts 18 and retained thereon by means of pins 23. The opposite ends of the bases 20 are adjustably secured above the beams 16 of the framework by adjusting devices 25.

Each adjusting devices includes an open housing 26, secured to the base by bolts 27, having a vertical shaft 29 extending through a sleeve 30 of the top wall of the housing. The lower end of the shaft is provided with a bevel gear 31 which meshes with a second bevel gear 32 mounted adjacent an end of a horizontal shaft 33 extending between the two housings. The upper end of the vertical shaft 29 is threadedly received in a circular nut 35 which is supported in an opening 36 of a bracket 37 fixed to the lower surface of the base 20. One or both ends of the horizontal shaft may be extended beyond the edge of the base 20 and squared to receive a suitable crank. In this manner, rotation of the horizontal shaft 33 in one direction will cause the nuts 35 and brackets 37 with bases 20 to rise above the framework 16, pivoting the base 20 about the posts 18 while rotation in a second direction will lower one end of the bases.

At spaced intervals along the length thereof, each base 20 is provided with transversely aligned openings 38 which receive and support bearing blocks 39. The bearing blocks 39 are retained in the openings by plates 40 and 41 and receive shaft extensions 42 of the support rolls 43 and 44. One of the shaft extensions of each roll 42 extends through the plate 41 beyond the edge of the base 20 and is provided with suitable sprockets 45 which are driven by a chain belt 46 connected to a power source 47. An adjustable idler sprocket 48 may be provided to vary the tension of the chain belt.

A pressure roll assembly 50 is adjustably mounted above one of the support rolls 43 and includes a roll 52 supported above the bases 20 by bearing blocks 51 which are guided for vertical movement in U-shaped members 53 fixed on the upper surface of the bases 20. The degree of pressure which the pressure roll 52 will exert on the support roll 43 is controlled by a coil spring 55, the tension of which is adjusted by a vertical adjusting screw 56 having an enlarged end (not shown) slidably received in an extension 57 on the bearing block 51. The screw is provided with a threaded enlarged member 54 which engages one end of the coil spring while the opposite end of the coil spring is in engagement with the bearing block 51. The upper end of the screw threadedly receives a bevel gear 58 that meshes with a second bevel gear 59 mounted on a horizontal shaft 60 which extends the width of the apparatus and is secured to an angle member 61. The angle member also functions as a rigidifying member for the spaced parallel beams. The above apparatus will allow vertical adjustment of the pressure roll 52 by rotating the horizontal shaft in the appropriate direction.

The second or receiving conveyor means 15 is constructed substantially in the same manner as the conveying means 14, in that the bases 70 are pivotally mounted on posts 18 at the end of the framework 13 opposite the first conveying means by pins 72 extending through yokes 71 fixed to the lower surface of the bases. The opposite or inner ends of the bases are adjustably mounted above the beams 16 through adjusting devices 25. Three pressure roll assemblies 75, 76 and 77, identical to construction of the pressure roll assembly 50 are provided with rolls 78, 79 and 80, respectively, which are positioned above selected support rolls 81 rotatably mounted at opposite ends in the bases 70, in the same manner as the support rolls 43. The support rolls 81 are provided with sprockets 82 at one end thereof which in common are driven by a drive chain 83 from a suitable power mechanism 84. The drive chain may be provided with adjustable idler sprockets 85 to provide appropriate amount of tension to the drive chain.

According to the invention, the innermost roll 44 of the first conveying means is provided with means for producing a reciprocating movement substantially perpendicular to the path of movement of the glass sheet to produce vibrations in the glass sheet. To this end, the vibrating means 11 includes an arm 90 pivotally mounted at one end by a shaft 91 rotating in a bearing block 92 fixedly secured to the upper surface of one base 20. The opposite end of the arm is provided with a bearing surface 93 engaging the shaft extension 42 of the backup roll 44 and is held in engagement by means of a spring 94 extending from the arm and secured to the inner surface of the base 20 by a screw 95. A vibrating mechanism 96 is secured to the arm 90 which may be of any standard construction, for example, a vibrating mechanism which may be readily adjusted to produce varying numbers of vibrations in a given time interval.

The operation of the glass breaking apparatus will be understood with particular reference to FIG. 4. A scored glass sheet enters the breaking apparatus on the driven support rolls 43 and the upper surface moves into engagement with pressure roll 52 over the backup roll 44 and onto the support rolls 81 of the second conveying means 15. The second conveying means is located at an inclined plane with respect to the first conveying means 14 so that a sheet of glass will be bodily deflected as it enters between the pairs of rolls 78 and 81. With sufficient pressure the sheet will break along the score line as it moves across the backup roll. However, the pressure required is greatly reduced by vibrating the backup roll 44. This vibration will be transmitted to the near edge of the glass and, with sufficient amplitude, will continuously and progressively reverse the stresses produced radially about the score line at the time at which the sheet is scored thereby allowing these stresses to assist in producing a quick, clean break along the score line as the sheet is moving between the first and second conveying means. While the angles between the theoretical horizontal line $x$ of FIG. 4 and the inclined lines $y$ and $z$ has been emphasized, it will be readily appreciated that this angle may be adjusted to the desired relationship dependent upon the various characteristics of the glass to be broken.

As can be readily understood, by provision of a vibration in the glass sheet, the pressure required on the leading edge to provide a break along the score line of the glass is greatly reduced. Also, the arrangement disclosed produces the maximum amplitude of vibration on one edge of the glass, starting the break at this end and running the break across the score line as it passes over the backup roll. Furthermore, by utilizing the apparatus constructed in accordance with the invention, harder fire finished or softer ground and polished glass sheets of varying thickness and/or width may be readily broken along a score line with essentially the same amount of pressure applied to the leading edge of the glass by merely changing the cycle and/or magnitude of vibration produced by the vibration generator 96.

Although in the embodiment shown, the vibration generator has been shown as associated with the backup roll, it is considered within the spirit of this invention that this vibration may be produced at various other places, for example, on the pressure rolls 52 or 78 or the first support roll 81 which will transmit essentially the same vibrations to the glass sheet at the score line.

Figures 6, 7:
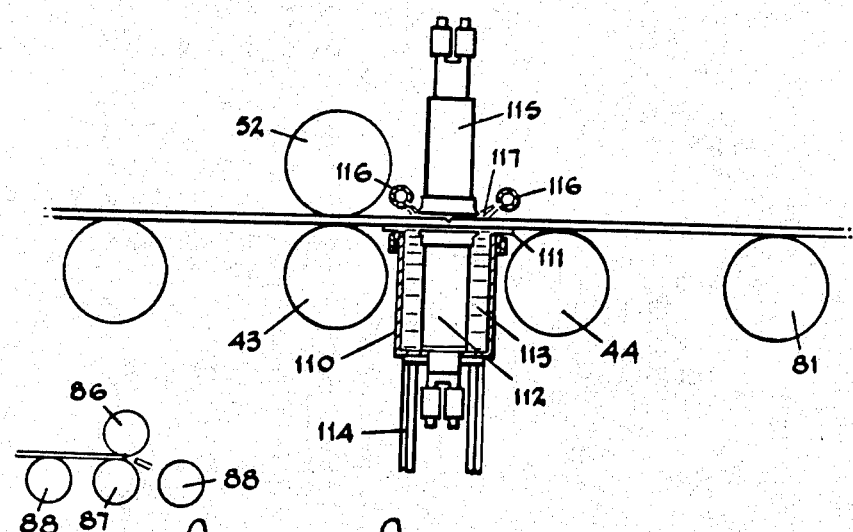
FIG. 6 is a longitudinal fragmentary view of the glass breaking machine showing a further modification of another type of vibrating means.
FIGS. 7 and 8 are diagrammatic views of two different arrangements of the rolls for a glass breaking unit.
Figure 8:
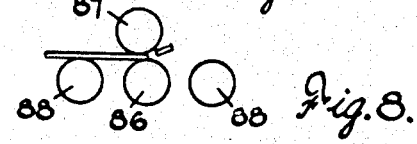

It should be noted at this point that although one arrangement of rolls in a glass-breaking unit is shown in FIG. 4, various other arrangements may be utilized without departing from the spirit of the invention. For example, FIG. 7 shows a modified roller arrangement whereby the breaker roll 86, is positioned above and slightly offset from the backup roll 87, which in this arrangement is one of the series of support rolls 88. In FIG. 8, the arrangement of the respective rolls is reversed and the backup roll 87 is located above the path of the moving sheet while the breaker roll 86 is one of the series of support rolls 88 for the moving sheet. In either of these arrangements, the vibrating means may be associated with either the backup or the breaker roll.

A modified form of vibrating means is shown in FIG. 5 and includes an arm 100 pivotally mounted above the base 20 by a shaft 101 received in a bearing block 102. The opposite end of the arm 100 is provided with a second shaft 103, extending across a portion of the glass ribbon $s$ and with a rotatable roll 104 mounted thereon and engaging the lower surface of the moving glass ribbon. A vibration generator 106, similar to vibrating mechanism 96, is mounted on the arm 100 which is springbiased by a spring 107 having one end secured to one end of the arm 100 and the opposite end secured to a pin 109 extending from a post 108 mounted above the base member 20. In this manner, the vibrations produced by the vibrating generator 106 are transmitted directly to the moving glass sheet just prior to its movement over the backup roll 44 where the sheet is broken along the previously made score line.

A further modified form of vibrating means is shown in FIG. 6, which is particularly adapted to transmit high frequency vibrations to the moving glass ribbon. To this end, there is provided a tank 110 positioned between the backup roll 44 and support roll 43. The upper edge of the tank is provided with a resilient member 111 engaging a lower surface of the moving glass sheet. A liquid medium 113 is placed in the tank and is provided with sound generating apparatus 112 for transmitting sonic energy to the liquid medium and in turn the glass sheet. The entire apparatus is supported on a suitable frame 114.

The sound generating apparatus or means 112, may be of various types; for example, one known type of means which may be utilized is the transducer shown in the patent to McAuley, No. 3,145,312, issued Aug. 18, 1964. A suitable high frequency voltage source (not shown) may be provided to produce the desired frequency of vibration through the transducer 112. Although only one transducer or unit is shown, it is obvious that any number may be provided and the tank 110 accordingly may extend across a minor portion or the entire width of the moving glass ribbon dependent upon the amount and location of vibration desired in the moving ribbon.

If desired, one or more transducer units 115 may be located above the moving glass ribbon and a layer of a liquid medium 117 introduced between the surface of the transducer and the moving glass ribbon by appropriate pipes 116 having restricted openings therein to provide aditional sonic energy to the moving ribbon.

It is to be understood that the forms of the invention herewith shown and described are to be taken as illustrative embodiments only of the same, and that various changes in the shape, size and arrangement of parts may be resorted to without departing from the spirit of the invention.

We claim:

1. A method of dividing glass sheets along a desired line which comprises, scoring one surface of said sheet along said line, applying tension to said scored surface and vibrating said sheet adjacent said score line.

2. A method for breaking glass having opposed surfaces along a desired line which comprises, scoring the glass on one surface along said line which produces stresses located radially about said score line, moving the glass along a path applying a force substantially perpendicular to the path of movement of said glass to place the scored surface in tension and the opposite surface in compression, and imparting vibratory movement to said moving sheet to cause reversal of said stresses thereby assisting in breaking of said sheet along said score line.

3. Apparatus for breaking a glass sheet scored along a predetermined line, comprising a backup roll engaging a surface of said sheet opposite said score line, a breaking roll for engaging the scored surface of said sheet and positioned to exert pressure on said surface and means for imparting vibratory movement to at least one of said rolls to assist in breaking said sheet along said score line.

4. Apparatus for breaking a moving glass sheet scored along a predetermined line comprising, a backup roll positioned in the path of movement of said sheet and engaging a surface thereof opposite said score line, a breaker roll positioned in the path of movement of said sheet beyond said backup roll for engaging the scored surface thereof and exerting pressure on said surface, and means for imparting vibratory movement to at least one of said rolls to assist in breaking said sheet along said score line.

5. Apparatus for severing a glass sheet scored along a predetermined line, comprising a first conveying means for moving said sheet in a first plane, a second conveying means adjacent said first conveying means for moving said sheet an inclination to said first plane, a roll engaging said sheet at the point of intersection of said first and second planes and means adjacent said roll for vibrating said sheet to assist in severing said sheet along said scored line.

6. An apparatus for breaking a moving glass sheet to run a break along a score line on the sheet parallel to the leading edge of the sheet, comprising a feeding conveyor means to move a glass sheet in a first plane; a receiving conveyor means to continue movement of said sheet in a second plane at an inclination to said first plane; a roll engaging said sheet at the point of intersection of said first and second planes; and means for vibrating said sheet to assist in running a cut along said score line.

7. Apparatus as defined in claim 6, wherein said vibrating means is located adjacent one side edge of said moving sheet to produce a maximum amplitude of vibration adjacent said edge.

8. Apparatus as defined in claim 7, wherein said vibrating means includes an arm pivotally mounted on said feeding conveyor means, a vibration generator mounted on said arm to vibrate said arm about said pivot, and means on said arm engaging said roll causing said roll to vibrate transverse to said moving sheet.

9. Apparatus as defined in claim 6, wherein said vibrating means includes a fluid medium engaging said glass ribbon and sound generating apparatus within said medium transmitting energy through said medium to said moving ribbon.

10. Apparatus as defined in claim 9, including a second-sound generating apparatus spaced from said fluid medium with said sheet moving therebetween and means for introducing a fluid between said second sound generating apparatus and said sheet.

11. Apparatus as defined in claim 6, wherein said vibrating means includes an arm pivotally mounted on said feeding conveyor means, sound generating means for vibrating said arm about said pivot, and means on said arm engaging said sheet to transmit said vibrations to said sheet.

12. A method of dividing glass sheets along a desired line which comprises: scoring one surface of a sheet along said line, applying forces to said sheet to place the scored surface in tension and the opposed surface in compression, and vibrating said sheet adjacent said score line to assist in dividing the sheet.

References Cited
UNITED STATES PATENTS

| | | | |
|---|---|---|---|
| 3,116,862 | 1/1964 | DeGorter | 225—2 |
| 3,122,953 | 3/1964 | Atkeson | 225—2 XR |

JAMES M. MEISTER, *Primary Examiner.*

WILLIAM W. DYER, JR., *Examiner.*